United States Patent
Ziegler et al.

(10) Patent No.: US 10,627,136 B2
(45) Date of Patent: Apr. 21, 2020

(54) CONTROL OF SOLAR TRACKER DEVICE (71) Applicant: Saint-Augustin Canada Electric Inc., Saint-Augustin de Desmaures (CA)

(72) Inventors: Martin Ziegler, Freiburg (DE); Unver Senol, Freiburg (DE); Johannes Wullner, Freiburg (DE)

(73) Assignee: Saint-Augustin Canada Electric Inc., Saint-Augustin de Desmaures (CA)

( * ) Notice: Subject to any disclaimer, the term of this patent is extended or adjusted under 35 U.S.C. 154(b) by 0 days.

(21) Appl. No.: 14/646,326

(22) PCT Filed: Nov. 11, 2013

(86) PCT No.: PCT/EP2013/073497
§ 371 (c)(1),
(2) Date: May 20, 2015

(87) PCT Pub. No.: WO2014/082844
PCT Pub. Date: Jun. 5, 2014

(65) Prior Publication Data
US 2015/0338131 A1  Nov. 26, 2015

(30) Foreign Application Priority Data

Nov. 28, 2012 (FR) ................................ 12 61364

(51) Int. Cl.
*F24S 50/60* (2018.01)
*F24S 40/80* (2018.01)
(Continued)

(52) U.S. Cl.
CPC ............... *F24S 50/60* (2018.05); *F24S 40/00* (2018.05); *F24S 40/85* (2018.05); *F24S 50/20* (2018.05); *H02S 20/32* (2014.12); *Y02E 10/47* (2013.01)

(58) Field of Classification Search
CPC ..... H02S 20/32; F24J 2/40; F24J 2/405; F24J 2/4607; F24J 2/4638; G01S 3/7861; F24S 40/00–90
See application file for complete search history.

(56) References Cited

U.S. PATENT DOCUMENTS 4,256,088 A * 3/1981 Vindum ................ G01S 3/7861
126/571
4,445,030 A * 4/1984 Carlton ................. G01S 3/7861
250/203.4
(Continued)

FOREIGN PATENT DOCUMENTS

CN 101533277 A 9/2004
CN 1841909 A 10/2006
(Continued)

OTHER PUBLICATIONS

"Interrupt." Merriam-Webster</i>, Merriam-Webster, www.merriam-webster.com/dictionary/interrupt.*
(Continued)

*Primary Examiner* — William E McClain
(74) *Attorney, Agent, or Firm* — TraskBritt (57) ABSTRACT The present invention relates to a method for controlling a tracker control unit and, therefore, the tracker device of a solar module of a solar power plant, wherein the tracker device comprises a control unit, an actuator element and a support means for supporting the solar module, comprising the steps of detecting a particular event, interrupting power supply to the control unit of the tracker device for a predetermined time period in reaction to the detection of the particular event, resuming power supply after the predetermined time period and in reaction to the resumed power supply actuating the support means by the actuator element to move the support means into a predetermined position.

18 Claims, 3 Drawing Sheets

(51) Int. Cl.
*H02S 20/32* (2014.01)
*F24S 50/20* (2018.01)
*F24S 40/00* (2018.01)

(56) References Cited

U.S. PATENT DOCUMENTS

| | | | | |
|---|---|---|---|---|
| 5,491,463 A * | 2/1996 | Sargeant | | H04B 3/542 |
| | | | | 340/12.37 |
| 5,691,691 A * | 11/1997 | Merwin | | H04L 12/2803 |
| | | | | 307/40 |
| 6,123,067 A * | 9/2000 | Warrick | | G01S 3/7861 |
| | | | | 126/593 |
| 2003/0062037 A1* | 4/2003 | Hayden | | H02S 20/00 |
| | | | | 126/570 |
| 2003/0102885 A1* | 6/2003 | Tsuboi | | G01R 31/3181 |
| | | | | 326/16 |
| 2003/0121514 A1* | 7/2003 | Davenport | | F24J 2/40 |
| | | | | 126/570 |
| 2005/0010352 A1* | 1/2005 | Michi | | B60K 31/0008 |
| | | | | 701/96 |
| 2005/0047047 A1* | 3/2005 | Matsuno | | G06F 21/87 |
| | | | | 361/115 |
| 2008/0009279 A1* | 1/2008 | Sakawa | | H04W 24/00 |
| | | | | 455/423 |
| 2008/0121525 A1* | 5/2008 | Doland | | C25B 1/04 |
| | | | | 204/661 |
| 2009/0003481 A1* | 1/2009 | Schopfer | | H04B 3/542 |
| | | | | 375/260 |
| 2009/0050192 A1* | 2/2009 | Tanaka | | F24J 2/38 |
| | | | | 136/246 |
| 2009/0188488 A1 | 7/2009 | Kraft et al. | | |
| 2010/0212653 A1* | 8/2010 | McDonald | | F24J 2/38 |
| | | | | 126/573 |
| 2010/0279532 A1* | 11/2010 | Inage | | H01R 13/641 |
| | | | | 439/188 |
| 2011/0057512 A1* | 3/2011 | Prax | | H02J 3/382 |
| | | | | 307/18 |
| 2011/0303213 A1* | 12/2011 | Kraft | | H02S 20/00 |
| | | | | 126/574 |
| 2012/0229049 A1* | 9/2012 | Mohan | | H05B 37/0245 |
| | | | | 315/307 |
| 2012/0285530 A1 | 11/2012 | Ziegler et al. | | |
| 2012/0298202 A1 | 11/2012 | Ziegler et al. | | |
| 2013/0048048 A1* | 2/2013 | Flanery | | H01L 31/052 |
| | | | | 136/246 |
| 2013/0112237 A1* | 5/2013 | Almogy | | F24J 2/38 |
| | | | | 136/246 |
| 2013/0181630 A1* | 7/2013 | Taipale | | H05B 37/0263 |
| | | | | 315/224 |
| 2013/0319508 A1* | 12/2013 | Sinclair | | H01L 31/042 |
| | | | | 136/246 |
| 2014/0020732 A1 | 1/2014 | Gerster et al. | | |
| 2015/0059851 A1 | 3/2015 | Gerster et al. | | |

FOREIGN PATENT DOCUMENTS

| | | | |
|---|---|---|---|
| JP | 2004165951 A * | 6/2004 | |
| WO | 2010003115 A1 | 1/2010 | |
| WO | WO-2013024369 A1 * | 2/2013 | ........... H01L 31/042 |

OTHER PUBLICATIONS

French Preliminary Search Report for French Application No. 1261364 dated Apr. 17, 2013, 7 pages.
International Search Report for International Application No. PCT/EP2013/073497 dated Jan. 20, 2014, 3 pages.
International Preliminary Report on Patentability for International Application No. PCT/EP2013/073497 dated Jun. 2, 2015, 8 pages.
International Written Opinion for International Application No. PCT/EP2013/073497 dated dated Jan. 30, 2014, 3 pages.
Chinese First Search for Chinese Application No. 201380061878 dated Jun. 17, 2016, 2 pages.
Chinese Office Action for Chinese Application No. 201380061878 dated Jun. 27, 2016, 11 pages.
Canadian Office Action for Canadian Application No. 2,930,646, dated Apr. 3, 2017, 3 pages.
Canadian Office Action for Canadian Application No. 2,930,646, dated Dec. 11, 2017, 3 pages.
Chinese Second Office Action for Chinese Application No. 201380061878, dated Mar. 3, 2017, 20 pages.
Chinese Office Action for Chinese Application No. 201380061878, dated Oct. 25, 2017, 8 pages.
Chinese Supplementary Search for Chinese Application No. 201380061878, dated Feb. 23, 2017, 1 page.

* cited by examiner

CONTROL OF SOLAR TRACKER DEVICE

CROSS-REFERENCE TO RELATED APPLICATIONS

This application is a national phase entry under 35 U.S.C. § 371 of International Patent Application PCT/EP2013/073497, filed Nov. 11, 2013, designating the United States of America and published in English as International Patent Publication WO 2014/082844 A1 on Jun. 5, 2014, which claims the benefit under Article 8 of the Patent Cooperation Treaty and under 35 U.S.C. § 119(e) to French Patent Application Serial No. 1261364, filed Nov. 28, 2012, the disclosure of each of which is hereby incorporated herein in its entirety by this reference.

TECHNICAL FIELD

The present invention relates to a central safety system for solar tracker devices and their tracker control units in a solar power plant.

BACKGROUND

Solar energy systems comprise solar modules including solar cell arrays. In order to enhance efficiency of the energy conversion of solar modules, apparatuses for tracking the modules to the current position of the sun are known in the art. The tracker apparatuses are provided for optimizing the electrical output power of the solar modules by following the path of the sun crossing the sky or by employing calculation of ephemerides. Two-axes trackers allow for angular motion of the solar modules about the horizontal axis ("tilt") and angular motion about the vertical axis ("rotation").

Tracker apparatuses are necessary in concentrator photovoltaic (CPV) systems wherein they can guarantee that the solar radiation impinges (almost) vertically on the concentrator optics.

A typical tracker apparatus comprises a tracker table or frame on which the photovoltaic module is mounted, mechanical actuators (e.g., electrically driven motors) for adjusting the tracker table, and a (vertical) column or rod for holding the actuators and the tracker table. In particularly dangerous circumstances, e.g., heavy winds or gusts or a power breakdown of the electrical grid, the tracker table has to be moved into a "safety position," i.e., basically horizontally, in order to prevent any damage done to the tracker table and the mounted photovoltaic module. In the art, central communication systems control the tracker apparatus to change the tracker table to a safety position by means of communication lines. Moreover, it is known to connect the actuators of the tracker apparatus directly to a control unit in order to enable the latter to directly cause the actuator to move the tracker table into the safety position. However, such conventional systems require expansive line routing and, in addition, may suffer from line breakage. If, for example, a communication line connection between a tracker control unit and the central communication system fails, the tracker table will not be brought into the safety position in case of danger or, as a means of precaution, will be operated to be in such a position in any case, i.e., usually without any actual risk of damage due to environmental effects, thereby reducing power production.

Thus, this disclosure addresses this underlying problem by providing a central safety system for the photovoltaic systems that reliably causes the tracker device to move into a safety position in case of danger without the need for a complex and expensive, as well as error-prone, line routing.

BRIEF SUMMARY

The above-mentioned problem is solved by a method for controlling a tracker device of a solar module of a solar power plant, wherein the solar power plant comprises a central safety system and wherein the tracker device comprises a control unit, an actuator element and a support means for supporting the solar module, the method comprising the steps of:
  detecting a particular event;
  interrupting for a predetermined time period power supply to the (control unit of the) tracker device in reaction to the detection of the particular event (by the central safety system);
  resuming power supply after the predetermined time period (initiated by the central safety system comprised in the solar power plant); and
  in reaction to the resumed power supply (and, thus, in reaction to the detected particular event), actuating the support means by the actuator element to move the support means (and thereby the solar module) into a predetermined position.

Herein, the control unit of the tracker device is also named "tracker control unit." In particular, all tracker devices of the solar power plant can be controlled as described above.

The solar module comprises an array of solar cells and, in principle, can be any solar module known in the art. In particular, the solar module may employ some concentrator optics comprising mirrors and/or lenses for focusing solar rays to the solar cells. The support means for supporting the solar module can be a tracker table or some frame comprising bars for mounting the solar module. The bars can be horizontal and/or vertical bars.

The particular event can be any event of danger, for example, a predetermined threshold for a wind velocity measured in the vicinity of the solar module or somewhere else being exceeded. Other events of danger comprise a power breakdown of the electrical grid, in particular, the electrical grid wherein power gained by the solar power plant is fed or the electrical grid used for operation of the solar power plant, or some failure of a control system controlling crucial parts of the solar power plant.

The particular position can be a position whereby the support means (and, thereby, the solar module) is oriented substantially horizontally. By "substantially horizontally" is meant a position with an angle of the main plane of the support means (solar module) to a vertical axis that is perpendicular to an essentially horizontally oriented ground plane, whereupon the tracker device is installed between 70° to 110° and, more particularly, 80° to 100° or 85° to 95°. In particular, by "substantially horizontally" is meant a position essentially parallel (within some ±20°, in particular, some ±10°, more particularly, some ±5°) to the ground, whereupon the tracker device is installed. The support means can be mounted on a vertical column (which may be rotatable) and, in this case, "substantially horizontally" covers a position wherein the support means is inclined to the vertical column within a range of angles of 70° to 110° and, more particularly, 80° to 100° or 85° to 95°.

For other particular events, such as snowfall or hailstorm, a particular position can be oriented substantially vertically in order to avoid and reduce the impact on solar modules.

The predetermined time period of interruption of electrical power supplied to the tracker device, in principle, can arbitrarily be chosen and can be in the range of some seconds or minutes (depending on the control unit of the tracker device used), in particular, of about 1 to 5 seconds.

The interruption and resumption of the electrical power supply causes the tracker device to move the support means (and, thus, the solar module mounted thereon) into a particular position, in particular, the safety position, in order to prevent damage of the solar module or avoid unnecessary operation of the same (for example, in the case of a power breakdown of the electrical grid wherein electric energy generated by the solar plant shall be fed). Thus, indispensable power lines can be used for communicating the emergency signal to the control unit of the tracker device that has to move the support means into a particular position. Thus, operation of the solar tracker devices does not depend on a communication via a communication line between a central communication system and the tracker control unit.

Unlike prior art, there is no risk that communication between the central communication system and the control unit of the tracker device fails due to some breakage of a communication line provided for transferring control signals from the central communication system to the control unit of the tracker device. In fact, no separate communication lines are necessary for causing the tracker device to move the support means into a particular position. Usage of the power lines represents a very reliable way of informing the tracker device that it has to move the support means into a particular position. For this, the control unit of the tracker device has to be configured to understand the information included in the interruption and resumption of electrical power supply. This can easily be realized by a standard corresponding control means/receiving means provided in the control unit of the tracker device and which is configured for receiving (and interpreting) information on the interruption/resumption of the power supply, for example.

The step of detecting a particular event can be performed by means of a plurality of sensors, for example, comprising air speed meters (anemometers), of the solar power plant. The solar power plant may have a plurality of solar modules provided with individual tracker devices and air speed meters. The central safety system can receive data from all of the air speed meters and, accordingly, cause interruption of power supply to one or more of the control units of the tracker devices in response to the data received from the air speed meters.

Although the disclosed method according to the above examples operates without the need for an additional communication between a central communication system and the control unit(s) of the tracker device(s), in very sensible applications, it may be preferred to have an additional communication path via a communication system comprising separate communication lines (other than the power supply line to the tracker device). Thus, according to an embodiment, the method further comprises sending a control signal to the tracker device comprising the actuator element over a communication line in reaction to the detection of a particular event. The control signal causes the tracker device to move the support means by the actuator element in order to move it into a predetermined position. Therefore, redundancy of providing information on a particular event to the tracker device(s) is achieved and a particular position will be adopted with even higher reliability as compared to the case where it is restricted to communication via power supply interruption only. The employed central communication system may comprise or consist of a Supervisory Control and Data Acquisition (SCADA) system.

The predetermined time period of interrupting the power supply should be chosen such that some unintentionally occurring power breakdown is not misinterpreted at the tracker device side. Short power breaks may happen accidentally and it may not be desirable to cause the tracker device to move the support means into a particular position in response to an accidental power break. According to a variant, the disclosed method comprises repeating the sequence of interrupting power supply to the tracker device for a predetermined time period and resuming power supply after the predetermined time period. In this variant, the support means is actuated by the actuator element to move the support means into the predetermined position after the repetition of the sequence. By repeating the steps of interrupting and resuming the power supply to the tracker device, unwanted movement into a particular position of the support means and, thus, the solar module, can be reliably avoided during an accidental power break of the power supply to the tracker device.

The solar power plant may comprise a backup power supply to be activated in case of a failure of power supply to the solar power plant that is necessary for the operation of the same. In particular, the method according to one of the above-described examples may further comprise activating a backup power supply for supplying power to the tracker device in reaction to the detection of a particular event or in reaction to a detected different event.

The above-mentioned problem is also addressed by a solar power plant comprising:
  at least one solar module or solar mirror mounted on a support means;
  a tracker device configured for moving the support means (and thereby the solar module) by means of an actuator element and comprising a tracker control unit configured to control the tracker device;
  a power supply means configured for supplying power to the tracker device;
  at least one sensor configured for detecting a particular event;
  a central safety system configured for interrupting the power supply from the power supply means to the control unit of the tracker device for a predetermined time period in reaction to the detection of a particular event and for resuming the power supply to the tracker device after the predetermined time period (and, thus, in reaction to the detected particular event); and
  wherein the tracker device is configured for moving the support means by means of the actuator element to move the support means into a predetermined position in reaction to the resumed power supply.

The disclosure is not limited to one particular sequence of interruption and resumption of power supply to the tracker device and its respective control unit. Any sequence could be used that also includes the possibility of varying the time periods of interruption and/or repeating at least once the steps of interrupting and resuming power supply in order to avoid misinterpretation of, for example, accidentally occasioned events like, for instance, short electric grid power supply interruptions.

As described with respect to the disclosed method provided herein, a particular position can be a position in which the support means (and thereby the solar module) is oriented substantially horizontally. Again, by "substantially horizontally" is meant a position with an angle of the main plane of the support means (solar module) to a vertical axis that is perpendicular to an essentially horizontally oriented ground plane whereupon the tracker device is installed between 70° to 110° and, more particularly, 80° to 100° or 85° to 95°. In particular, "substantially horizontally" means a position essentially parallel (within some ±20°, in particular, some ±10°, more particularly, some ±5°) to the ground whereupon the tracker device is installed. The support means can be mounted on a vertical column (which may be rotatable) and, in this case, "substantially horizontally" covers a position wherein the support means is inclined to the vertical column within a range of angles of 70° to 110° and, more particularly, 80° to 100° or 85° to 95°.

The particular event may comprise or consist of a velocity of wind measured in the vicinity of the solar module (or somewhere else) that exceeds a predetermined threshold, power breakage of an electrical grid, or failure of a control system controlling parts of the solar power plant, for example, some failure of the recited central communication system.

Usually, the solar power plant may comprise more than one solar module and tracker device. Thus, according to an embodiment, the solar power plant comprises:
 a plurality of solar modules and a plurality of tracker devices, each provided with a control unit; and
 a plurality of sensors, for example, comprising air speed meters, each configured to generate detection data (for example, data about a wind velocity detected by the sensors) and configured to send the detection data to the central safety system; and
 wherein the central safety system is configured to interrupt power supply to particular ones of the plurality of tracker devices in reaction to the detection data sent by the plurality of sensors to the central safety system. Each of the tracker devices can be equipped with its own control unit. Alternatively, a single control unit can be provided to control a particular number of the tracker devices.

If a particular event, for example, a wind speed exceeding a predetermined limit, is detected at one or more locations of the power plant, it may be sufficient to move only respective tracker devices where the excessive wind speed is measured to the particular positions (safety positions), whereas the other tracker devices in other sections of the power plant are kept in an operation state. In the operation state, which is different from a safety or horizontal state, the solar module on the tracker device operates by generating electric energy.

The solar power plant may further comprise a central communication system (for example, in the form of SCADA system) comprising a communication line (which normally is different from the power supply to the tracker device) connecting the central communication system and at least one control unit of the tracker device. The central communication system is configured to send a control signal (emergency signal) to the control unit of the tracker device comprising the actuator element over the communication line in reaction to the detection of a particular event that causes the tracker device to move the support means by means of the actuator element into the predetermined position.

According to a further embodiment, the solar power plant further comprises a programmable controller (like a programmable field bus system) and at least one sensor. The power supply means, the tracker device and the central safety system can communicate with each other or at least one of the others via the programmable controller (like a field bus system).

In the above examples, the central safety system may be configured to repeat the sequence of interrupting the power supply from the power supply means to the tracker control unit for a predetermined time period and resuming the power supply to the tracker control unit after the predetermined time period. In this case, the actuator element may be configured to move the support means into the predetermined position after the repetition of the sequence.

The central safety system can be adapted to a particular configuration of the solar power plant. For example, it can be connected to a backup power supply.

In all of the examples of the solar power plant according to this disclosure, the solar module(s) may comprise concentrator optics as known in the art.

BRIEF DESCRIPTION OF THE DRAWINGS

Additional features and advantages of this disclosure will be described in the following detailed description. In the description, reference is made to the accompanying figures that are meant to illustrate examples of the disclosure. It is understood that such examples do not represent the full scope of the disclosure. Equal elements illustrated in the drawings are provided with equal reference numerals. Parts of the description relating to equal elements illustrated in the different drawings may be left out.

DETAILED DESCRIPTION

Figure 1:
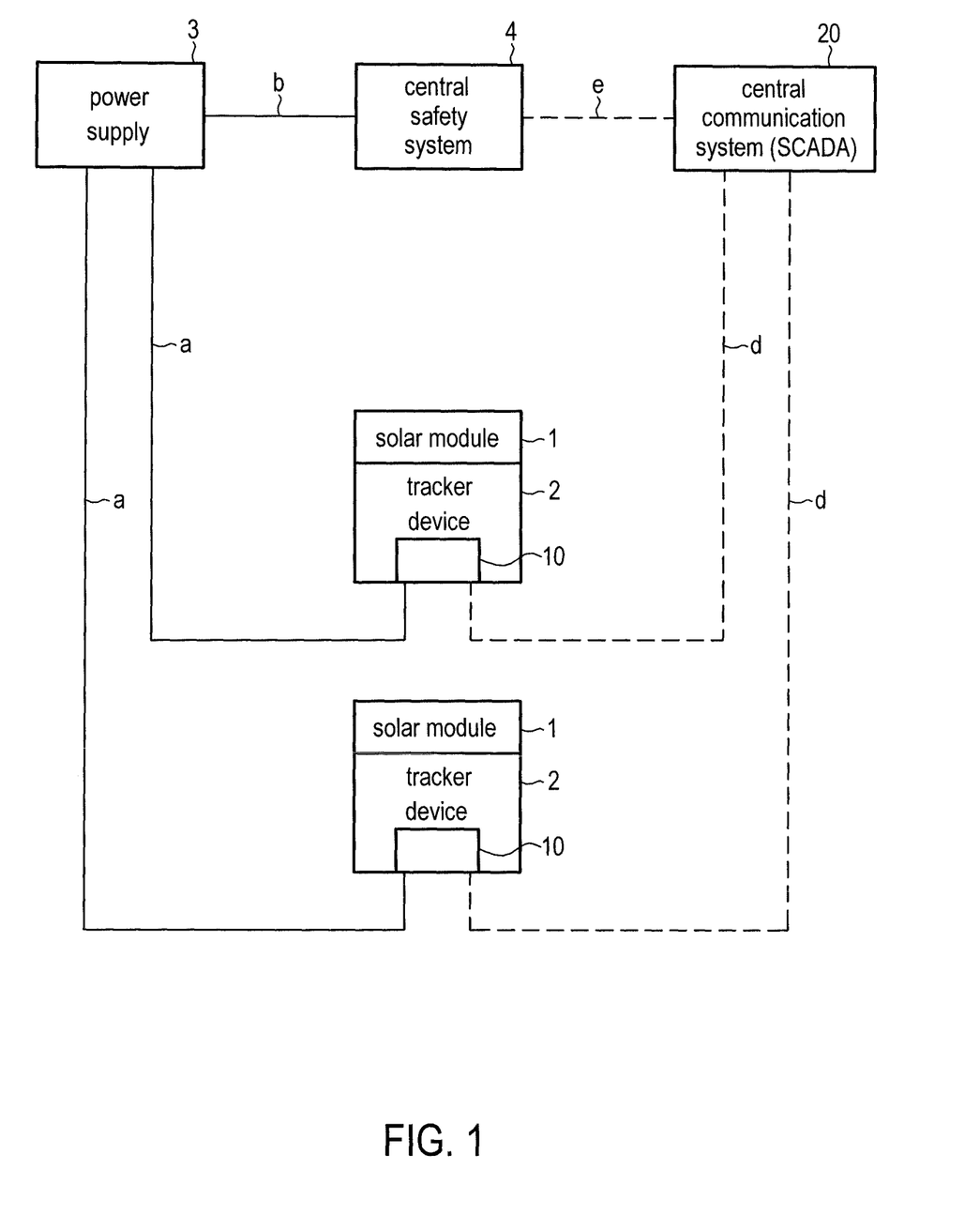
FIG. 1 illustrates a configuration of a central safety system, tracker control unit, tracker devices of solar modules and sensors of a solar power plant in accordance with an example of this disclosure.

FIG. 1 shows an example of a configuration of basic elements of a solar power plant according to this disclosure. Two solar modules 1, each provided with a tracker device 2 that is controlled by a respective tracker control unit 10 are schematically shown. The tracker control units 10 are connected with a power supply means 3 by power lines a. The power supply means 3 is also connected by a control line b with a central safety system 4. The power supply means 3 is schematically shown in FIG. 1 and can include a connection to the electrical grid or include a backup power supply, as shown schematically in FIG. 3.

The central safety system 4 detects an event with one or more sensors. For example, a wind sensor detects high wind speed at the location of the tracker device 2. In the following description of this example, it is assumed that the sensors are air speed meters measuring the wind velocity. Other kinds of sensors can be incorporated in the disclosure.

If the measured wind speed exceeds some predetermined threshold at a particular location of a section of tracker devices 2, the central safety system 4 interrupts the power supply means 3 to the tracker control units 10 of the respective tracker devices 2 for a predetermined time period and switches on power supply via power supply line a again after the predetermined time period via control line b. The interruption and resumption of the power supply via the power supply line a is interpreted at the side of the tracker control unit 10 as a command to move the respective tracker device 2 with the solar module 1 (at the location of which the excessive wind speed was detected by a sensor) into a safety position, i.e., into a horizontal position in this example.

Figure 2A:
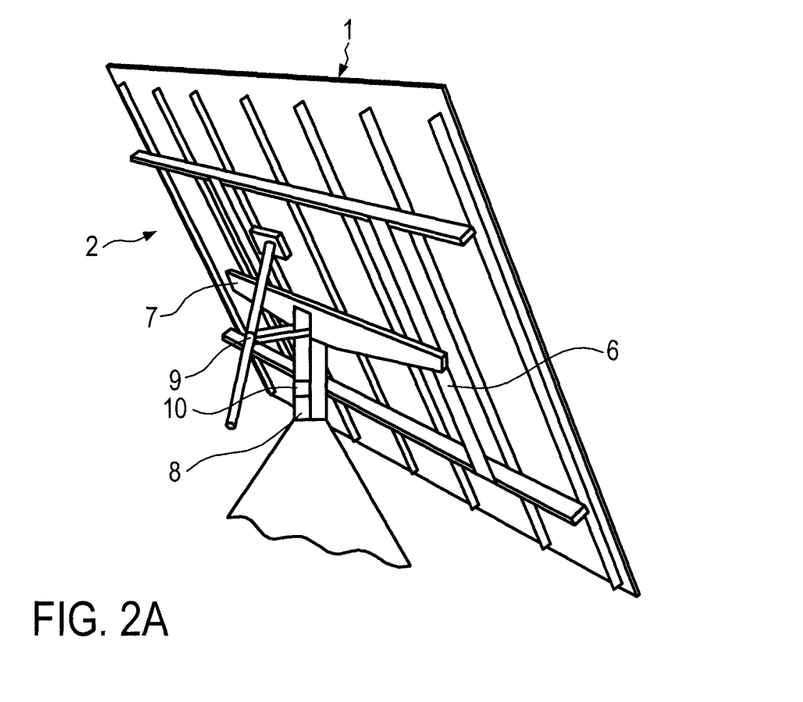
FIGS. 2A and 2B illustrate a solar module with a tracker device and tracker control unit wherein the solar module/support means of the tracker device is shown in an operation position (FIG. 2A) and in a safety position (FIG. 2B).
Figure 2B:
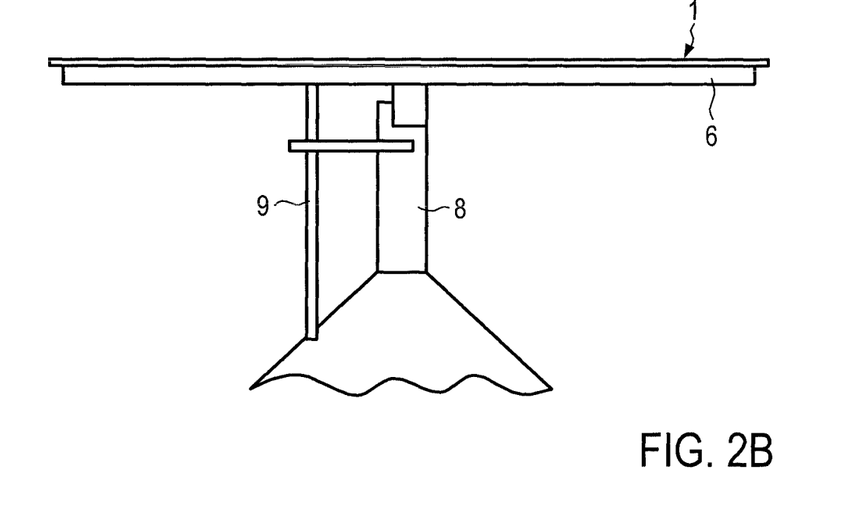

An example for a solar module 1 and a tracker device 2 comprising a tracker control unit 10 and a support frame 6 is shown in more detail in FIGS. 2A and 2B. The solar module 1 comprises an array of solar cells and is supported on the support frame 6 comprising vertical and horizontal bars. The frame is mounted by a horizontal beam 7 to a vertical rotatable column 8 that can be driven by an actuator of the tracker device 2. The tracker device 2 comprises the rotatable column 8 that is driven by an actuator (not shown) and a tilting means 9 for appropriately tilting the support frame 6. However, the disclosure is not limited to this type of tracker device and can be implemented for any type of tracker device, in particular, two axes trackers for concentrated photovoltaics. FIG. 2A shows the assembly in an operation state for collecting solar rays and converting solar energy into electric energy. In FIG. 2B, the same assembly is shown in a horizontal safety position of the solar module 1 that is adopted by means of the tilting means 9 of the tracker device 2. The tracker control unit 10 comprises an electrical panel (not shown) to control the tracker device 2.

Coming back to FIG. 1, it is to be stated that besides the power supply line a, in principle, no other communication means between the central safety system 4 and the tracker control unit 10 for controlling the tracker devices 2 to move the respective solar modules 1 into the safety position is needed. However, if desired, optional separate communication lines d can be provided that connect a central communication system 20 and the tracker control unit 10 with the tracker devices 2 of the solar modules 1. The central communication system 20 and the central safety system 4 communicate via line e. The optional communication lines d and e are schematically represented in FIG. 1 by dashed lines.

The communication line e can be used to exchange information between the central safety system 4 and the central communication system 20. For example, the central communication system 20 can report a particular event that may not be detected by the central safety system 4 itself and indicates that the tracker devices 2 have to move into the safety position.

The central safety system 4 can, on the other side, report to the central communication system what the particular status is and if a dangerous situation is present for the tracker devices 2. The central communication system 4 then can support the action to bring the tracker devices 2 into the safety position.

Both the central safety system 4 and the central communication system 20 can have their respective set of sensors in order to detect different categories of particular events, such as, for instance, wind speed meters for the central safety system 4 in order to detect exceeding wind speeds or a sensor connected to the central communication system 20 reporting on electrical grid malfunctioning. The communication line e thus enables one to share distinct features and report complementary information to both systems, therefore, reliably driving the tracker device into a safety position. However, both systems can be connected to the same type of sensors in order to increase the reliability of the positioning system for very sensitive applications.

In a redundant operation mode in addition to the interruption and resumption of the power supply, the central communication system 20 can send explicit commands to the tracker device 2 via the separate communication lines d in order to cause movement of solar modules 1 into the safety position, if the wind speed exceeds a predetermined limit at the location of the respective solar modules 1. Both operations of sending explicit command signals via the communication line d and interrupting and resuming power supply to the tracker devices 2 via the power supply lines a guarantee a very high level of reliability of the safety positioning operation in case of danger or occurrence of a particular event.

Figure 3:
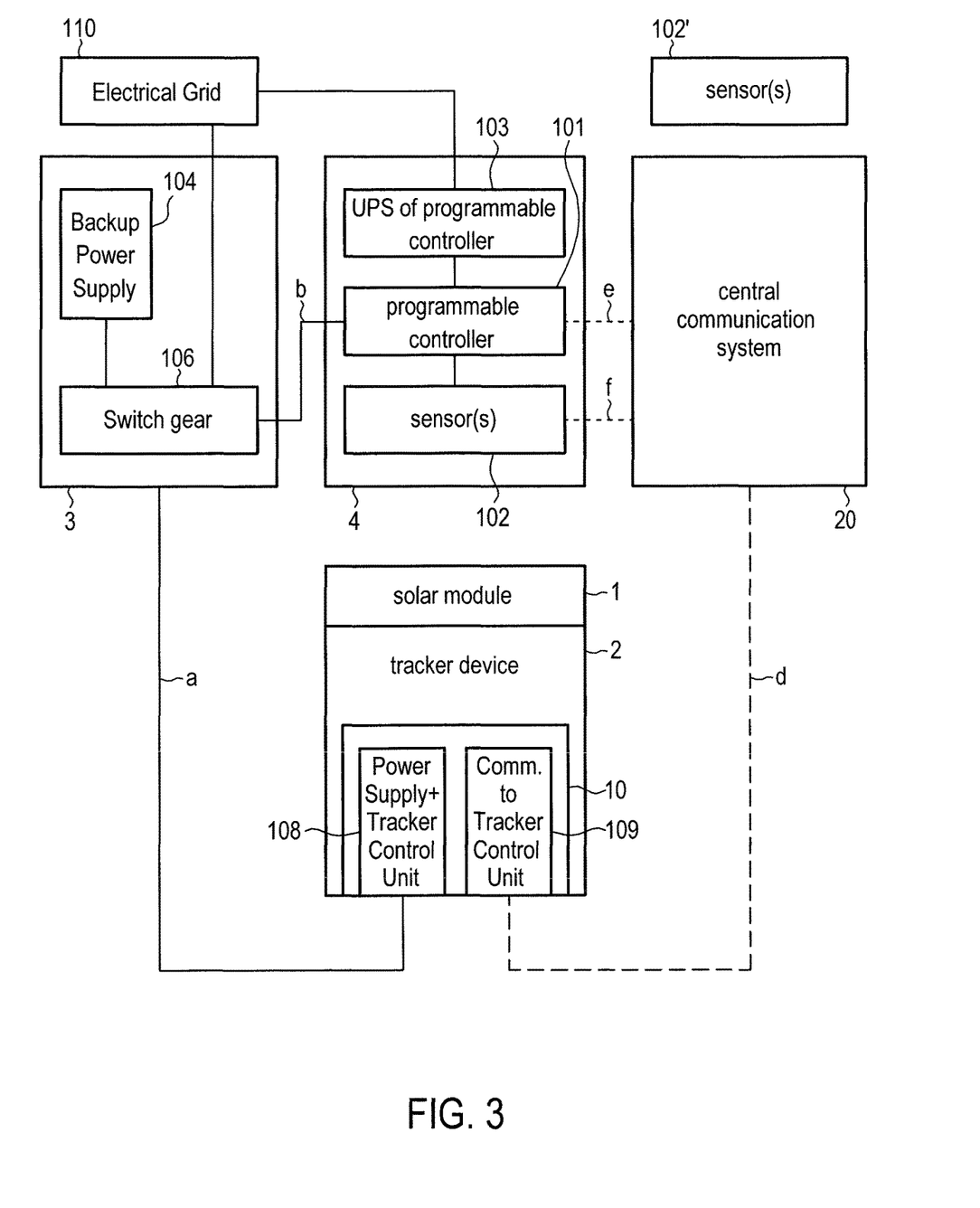
FIG. 3 illustrates a configuration of a central safety system of a solar power plant in accordance with an example of this disclosure.

FIG. 3, inter alia, shows a configuration of a central safety system 4 of a solar power plant in accordance with an example of this disclosure in more detail. The shown central safety system 4 is connected to the electrical grid 110 and the central communication system 20. The central safety system 4 comprises a programmable controller 101 for basic communication between components inside the central safety system 4 and the central communication system 20 via communication line e. The central safety system 4 further comprises at least a sensor 102, for instance, a wind sensor to detect the wind speed, connected to the programmable controller 101. Moreover, an uninterruptible power source (UPS) 103 is connected to the programmable controller 101 for providing emergency power to the programmable controller 101 in case of a main power breakdown.

The power supply means 3 shown schematically in FIG. 3 comprises a connection to the electrical grid 110, which also provides an electrical connection to the central safety system 4. The power supply 3 is controlled by the programmable controller 101. Additionally, a backup power supply 104, for example, a battery, provides emergency power to the tracker control units, allowing movement of the tracker devices with the solar modules into the safety position (for example, horizontal position) in case of a main power breakdown, controlled by the programmable controller 101. The power supply 3 provides the emergency power from the backup power supply 104 or the power from the electrical grid 110 to the tracker device 2 and the tracker control unit 10 via power lines a via the switch gear 106 comprised in the power supply 3 and controlled by the programmable controller 101 via control line b.

The programmable controller 101 controls via a switch gear 106 the power supply of tracker control units 10 of respective tracker devices 2 (interruption and resumption as described with reference to FIG. 1). The central communication system 20 allows for communication to the tracker control units 10 of tracker devices 2 via communication lines d and communication means 109 provided in addition to the power supply lines a as also described with reference to FIG. 1. The central communication system 20 is connected by data lines with at least a sensor 102', for instance, a wind sensor, in order to communicate particular events (for example, excessive wind velocities detected by the wind sensor 102') to the central communication system 20 via the communication line e as already explained above. Such a sensor 102' can be different from the sensor 102 comprised in the central safety system 4, but is not limited to it, and is shown schematically in FIG. 3. The dashed line f to sensor 102 represents the possibility of using the same set of sensors for the central safety system 4 and the central communication system 20.

Switch gear 106 is used to distribute the power to the tracker control units 10, as commanded by the programmable controller 101 via control line b due to the detection of a particular event. The central communication system 20 and the communication means 109 are used to connect all devices (including the tracker control unit 10) to a communication network. In standard solar power plants, Ethernet cables and, depending on the size of the CPV Power Plant, also fiberoptic cables, can be used to realize the communication. However, the disclosure is not limited to these types of realized communication.

The shown central safety system 4 gets information from sensors, like the wind sensor 102, and from other central components, like the power supply 3, the backup power supply 104, the UPS of the programmable controller 103 and from the central communication system 20. Theses central components may also send status events to the programmable controller 101 like an error message coming from the backup power supply 104 indicating that it does not have enough energy to bring the tracker devices into the safety position in case of another upcoming event, like a main power breakdown. Based on this information, the programmable controller 101 can decide to take the tracker device 2 into the safety position as a precaution and inform the central communication system 20 over the communication line e about the particular event. These kinds of status events can be sent from all central components to the programmable controller 101.

Based on this information, the programmable controller 101 steers the different elements like the switch gear 106 of the power supply 3 or, in a particular case, the backup power supply 104, to control the power supply 108 of the tracker control units 10, which is schematically shown in FIG. 3 (interruption and resumption of the power supply to the tracker control unit 10).

All previously discussed examples are not intended as limitations but serve as examples illustrating features and advantages of the disclosure. It is to be understood that some or all of the above-described features can also be combined in different ways.

The invention claimed is:

1. A method for controlling a tracker device of a solar module of a solar power plant, wherein the solar power plant comprises a central safety system and wherein the tracker device comprises a control unit, an actuator element and a support means for supporting the solar module, the method comprising the steps of:
    detecting a particular event;
    switching off for a predetermined time period a power supply to the control unit of the tracker device in reaction to the detection of the particular event, the predetermined time period being in the range of 1 second to 5 minutes;
    switching on the power supply after the predetermined time period;
    repeating the sequence of switching off the power supply to the control unit of the tracker device in reaction to the detection of the particular event and switching on the power supply after the predetermined time period; and
        only after the repetition of the sequence, actuating the support means by the actuator element to move the support means into a predetermined position; and
    wherein the particular event comprises an error message from a backup-power supply configured for supplying power to the tracker device.

2. The method according to claim 1, wherein the predetermined position of the support means is a substantially horizontal safety position.

3. The method according to claim 1, wherein the predetermined position of the support means is a substantially vertical safety position.

4. The method according to claim 1, wherein the step of detecting the particular event is performed by means of one or more sensors.

5. The method according to claim 4, further comprising sending a control signal to the control unit of the tracker device over a communication system comprising a communication line in reaction to the detection of the particular event, wherein the control signal causes the tracker device to move the support means into the predetermined position.

6. The method according to claim 1, further comprising activating the backup-power supply for supplying power to the tracker device in reaction to the detection of the particular event or in reaction to a detected different event.

7. A solar power plant, comprising:
    at least one solar module mounted on a support means;
    a tracker device configured for moving the support means by means of an actuator element and comprising a tracker control unit configured to control the tracker device;
    a power supply means configured for supplying power to the tracker device;
    at least one sensor configured for detecting a particular event;
    a central safety system configured for switching off the power supply from the power supply means to the tracker control unit of the tracker device for a predetermined time period in reaction to the detection of the particular event, the predetermined time period being in the range of 1 second to 5 minutes, and for switching on the power supply to the tracker device after the predetermined time period and for repeating the sequence of switching off the power supply from the power supply means to the tracker control unit of the tracker device in reaction to the detection of the particular event and switching on the power supply to the control unit of the tracker device after the predetermined time period; and
    wherein the tracker device is configured for moving the support means by means of the actuator element to move the support means into a predetermined position only after the repetition of the sequence; and
    further comprising a backup-power supply configured for supplying power to the tracker device and wherein the particular event comprises an error message from the backup-power supply.

8. The solar power plant according to claim 7, further comprising:
    a plurality of solar modules and a plurality of tracker devices, each equipped with a tracker control unit; and
    a plurality of sensors each configured to generate detection data and send the detection data to the central safety system; and
    wherein the central safety system is configured to switch off power supply to particular ones of the tracker control units of the plurality of the tracker devices in reaction to the detection data sent by the plurality of sensors to the central safety system.

9. The solar power plant according to claim 7, wherein the predetermined position of the support means is a substantially horizontal safety position.

10. The solar power plant according to claim 7, wherein the predetermined position of the support means is a substantially vertical safety position.

11. The solar power plant according to claim 7, further comprising a central communication system comprising a communication line connecting the central communication system and at least one solar module, and wherein the central communication system is configured to send a control signal to the tracker device of the at least one solar module over the communication line in reaction to the detection of the particular event that causes the tracker device to move the support means by means of the actuator element into the predetermined position.

12. The solar power plant according to claim 7, wherein the central safety system further comprises a programmable controller, and wherein the at least one sensor, the power supply means, the tracker device and the central safety system can communicate with each other or at least one of the others via the programmable controller.

13. The solar power plant according to claim 7, wherein the at least one solar module comprises concentrator optics.

14. The solar power plant according to claim 8, wherein the predetermined position of the support means is a substantially horizontal safety position.

15. The method according to claim 1, comprising controlling a switch gear for switching on and switching off the power supply.

16. The solar power plant according to claim 12, wherein the power supply means comprises a switch gear and the programmable controller is configured to control the switch gear to switch on and off the power supply.

17. A method for controlling a tracker device of a solar module of a solar power plant, wherein the solar power plant comprises a central safety system and wherein the tracker device comprises a control unit, an actuator element and a support means for supporting the solar module, the method comprising the steps of:

detecting a particular event;
switching off for a predetermined time period a power supply to the control unit of the tracker device in reaction to the detection of the particular event;
switching on the power supply after the predetermined time period, the predetermined time period being 1 second to 5 minutes;
repeating the sequence of switching off the power supply to the control unit of the tracker device in reaction to the detection of the particular event and switching on the power supply after the predetermined time period; and
only after the repetition of the sequence, actuating the support means by the actuator element to move the support means into a predetermined position; and
wherein the particular event comprises an error message from a backup-power supply configured for supplying power to the tracker device; and
wherein the error message indicates that the backup-power supply has not enough energy to bring the tracker devices into the safety position.

18. A solar power plant, comprising:
at least one solar module mounted on a support means;
a tracker device configured for moving the support means by means of an actuator element and comprising a tracker control unit configured to control the tracker device;
a power supply means configured for supplying power to the tracker device;
at least one sensor configured for detecting a particular event;
a central safety system configured for switching off the power supply from the power supply means to the tracker control unit of the tracker device for a predetermined time period in reaction to the detection of the particular event, the predetermined time period being in the range of 1 second to 5 minutes, and for switching on the power supply to the tracker device after the predetermined time period and for repeating the sequence of switching off the power supply from the power supply means to the tracker control unit of the tracker device in reaction to the detection of the particular event and switching on the power supply to the control unit of the tracker device after the predetermined time period; and
wherein the tracker device is configured for moving the support means by means of the actuator element to move the support means into a predetermined position only after the repetition of the sequence; and
further comprising a backup-power supply configured for supplying power to the tracker device and wherein the particular event comprises an error message from the backup-power supply; and
wherein the error message indicates that the backup-power supply has not enough energy to bring the tracker devices into the safety position.

* * * * *